(12) United States Patent
Huang et al.

(10) Patent No.: US 11,671,349 B2
(45) Date of Patent: Jun. 6, 2023

(54) PACKET FORWARDING METHOD AND RELATED APPARATUS

(71) Applicant: Huawei Technologies Co., Ltd., Guangdong (CN)

(72) Inventors: Yi Huang, Beijing (CN); Jing Hu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/446,413

(22) Filed: Aug. 30, 2021

(65) Prior Publication Data
US 2022/0086080 A1    Mar. 17, 2022

(30) Foreign Application Priority Data
Sep. 16, 2020  (CN) .......................... 202010975328.0

(51) Int. Cl.
| | |
|---|---|
| *H04L 45/24* | (2022.01) |
| *H04L 45/02* | (2022.01) |
| *H04L 45/745* | (2022.01) |
| *H04L 47/125* | (2022.01) |
| *H04L 47/2483* | (2022.01) |

(52) U.S. Cl.
CPC .............. *H04L 45/24* (2013.01); *H04L 45/02* (2013.01); *H04L 45/745* (2013.01); *H04L 47/125* (2013.01); *H04L 47/2483* (2013.01)

(58) Field of Classification Search
CPC ....... H04L 45/24; H04L 45/02; H04L 45/745; H04L 47/125; H04L 47/2483; H04L 47/2441
See application file for complete search history.

(56) References Cited

U.S. PATENT DOCUMENTS

| | | | |
|---|---|---|---|
| 8,619,587 B2 | 12/2013 | Yong et al. | |
| 8,879,397 B2* | 11/2014 | Xi .......................... | H04L 47/125 370/237 |
| 9,832,122 B2 | 11/2017 | Dharmapurikar et al. | |
| 2011/0164503 A1* | 7/2011 | Yong ....................... | H04L 69/22 370/235 |
| 2013/0286846 A1* | 10/2013 | Atlas ...................... | H04L 47/726 370/235 |
| 2014/0092738 A1* | 4/2014 | Grandhi .................. | H04L 45/22 370/235 |
| 2018/0375767 A1* | 12/2018 | Li ........................... | H04L 45/38 |

\* cited by examiner

*Primary Examiner* — Donald L Mills
(74) *Attorney, Agent, or Firm* — Womble Bond Dickinson (US) LLP

(57) ABSTRACT

This application provides a packet forwarding method and a related apparatus. The method includes: determining whether a flow to which a packet belongs meets a large flow condition; and if the flow to which the packet belongs meets the large flow condition and a flowlet routing table does not include a flowlet entry corresponding to the flow, creating the corresponding flowlet entry in the flowlet routing table, and forwarding the packet based on the created flowlet entry. In the foregoing technical solution, a corresponding flowlet entry may be created only for a large flow, to perform flowlet-based load balancing on the large flow. This can reduce an entry resource used for flowlet-based load balancing, improve balance of multi-path load sharing, and effectively improve a traffic sharing effect of load balancing.

18 Claims, 5 Drawing Sheets

PACKET FORWARDING METHOD AND RELATED APPARATUS

CROSS-REFERENCE TO RELATED APPLICATIONS

This application claims priority to Chines Patent Application No. 202010975328.0, filed on Sep. 16, 2020, which is hereby incorporated by reference in its entirety.

TECHNICAL FIELD

This application relates to the field of communications technologies, and more specifically, to a packet forwarding method and a related apparatus.

BACKGROUND

In a data communication network, a plurality of switches and routers (hereinafter collectively referred to as forwarding nodes) form a network for forwarding network traffic. A single data packet (for example, a layer 3 internet protocol (IP) packet) in the network traffic may be routed to a destination network device (for example, a computer) by using the forwarding nodes through different paths. When a large amount of network traffic passes through a forwarding node, a layer 3 load balancing technology is used for the forwarding node to reduce network congestion and a packet forwarding delay. When a same flow has a plurality of forwarding paths, the forwarding node having the layer 3 layer 3 load balancing technology selects to forward all or some packets of the flow to different paths, to implement traffic balancing on the different paths.

Equal-cost multi-path routing (ECMP) is used in a conventional layer 3 load balancing technology. A forwarding node using the ECMP stores an ECMP routing table. After receiving a data packet, the forwarding node calculates an index based on flow identity information of the data packet, then queries the ECMP routing table for an entry matching the index, and forwards the data packet based on a next-hop port included in the entry. However, the ECMP has a poor load balancing effect in some scenarios.

SUMMARY

This application provides a packet forwarding method and a related apparatus, to improve balance of multi-path load sharing.

An embodiment of this application provides a packet forwarding method, including: determining a first identifier based on flow identity information of a first packet, where the first identifier is an identifier of the first packet; and when a first flow to which the first packet belongs is a large flow and a flowlet routing table does not include a first flowlet entry corresponding to the first flow, creating the first flowlet entry in the flowlet routing table, and forwarding the first packet based on the first flowlet entry, where the first flowlet entry includes the first identifier.

In the foregoing technical solution, a corresponding flowlet entry may be created only for a large flow, to perform flowlet-based load balancing on the large flow. This can reduce an entry resource used for flowlet-based load balancing, improve balance of multi-path load sharing, and effectively improve a traffic sharing effect of load balancing.

In an embodiment, the flowlet routing table includes at least one flowlet entry, the at least one flowlet entry is in a one-to-one correspondence with at least one flow, and the first flow is any one of the at least one flow. Because each flowlet entry corresponds to only one flow, a problem that effective load balancing cannot be implemented to share traffic because a plurality of flows match one flowlet entry can be reduced.

In an embodiment, the at least one flowlet entry is a valid entry in the flowlet routing table.

In an embodiment, the creating the first flowlet entry includes: determining a first dynamic entry from a dynamic routing table based on the first identifier, where an identifier field of the first dynamic entry includes the first identifier; and determining a first next-hop port in a plurality of next-hop ports included in the first dynamic entry, where the first next-hop port is a next-hop port included in a next-hop port field in the first flowlet entry.

In an embodiment, the determining a first next-hop port in a plurality of next-hop ports included in the first dynamic entry includes: obtaining a plurality of pieces of path quality, where the plurality of pieces of path quality are in a one-to-one correspondence with the plurality of next-hop ports; and determining a next-hop port corresponding to a piece of path quality that meets a preset condition in the plurality of pieces of path quality as the first next-hop port.

In an embodiment, the method further includes: determining a second identifier based on flow identity information of a second packet, where the second identifier is an identifier of the second packet; and when a second flow to which the second packet belongs is not a large flow, forwarding the second packet based on the second identifier and an equal-cost multi-path routing ECMP routing table.

In the foregoing technical solution, an ECMP technology is used to forward a flow that is not a large flow. In other words, whether to forward a packet based on the flowlet routing table or the ECMP routing table may be determined based on whether a flow to which the packet belongs is a large flow. This can improve the balance of multi-path load sharing, and effectively improved the traffic sharing effect of load balancing.

In an embodiment, the method further includes: receiving a third packet; determining a third identifier based on flow identity information of the third packet, where the third identifier is an identifier of the third packet; determining, based on the third identifier, whether the flowlet routing table includes a third flowlet entry, where the third flowlet entry includes the third identifier; and if the flowlet routing table includes the third flowlet entry, forwarding the third packet based on the third flowlet entry, or if the flowlet routing table does not include the third flowlet entry, determining whether a third flow to which the third packet belongs is a large flow, and based on a determined result, creating the third flowlet entry in the flowlet routing table or forwarding the third packet based on the ECMP routing table.

In an embodiment, the method further includes: receiving a fourth packet; determining a fourth identifier based on flow identity information of the fourth packet, where the fourth identifier is an identifier of the fourth packet; determining whether a fourth flow to which the fourth packet belongs is a large flow; and when the fourth flow is a large flow, forwarding the fourth packet based on a fourth flowlet entry in the flowlet routing table, where the fourth flowlet entry includes the fourth identifier, or when the fourth flow is not a large flow, forwarding the fourth packet based on the ECMP routing table.

According to a second aspect, an embodiment of this application further provides a network device. The network device includes modules configured to implement the method according to any one of the first aspect or the possible designs of the first aspect.

According to a third aspect, an embodiment of this application further provides a network device, including a processor. The processor is configured to be coupled to a memory, and read and execute instructions and/or program code in the memory, to perform the method according to any one of the first aspect or the possible designs of the first aspect.

According to a fourth aspect, an embodiment of this application further provides a chip system, including a logic circuit. The logic circuit is configured to be coupled to an input/output interface, and transmit data through the input/output interface, to perform the method according to any one of the first aspect or the possible designs of the first aspect.

According to a fifth aspect, an embodiment of this application further provides a computer-readable storage medium. The computer-readable medium stores program code, and when the computer program code is run on a network device, the network device is enabled to perform the method according to any one of the first aspect or the possible designs of the first aspect.

DESCRIPTION OF EMBODIMENTS

Figure 1:
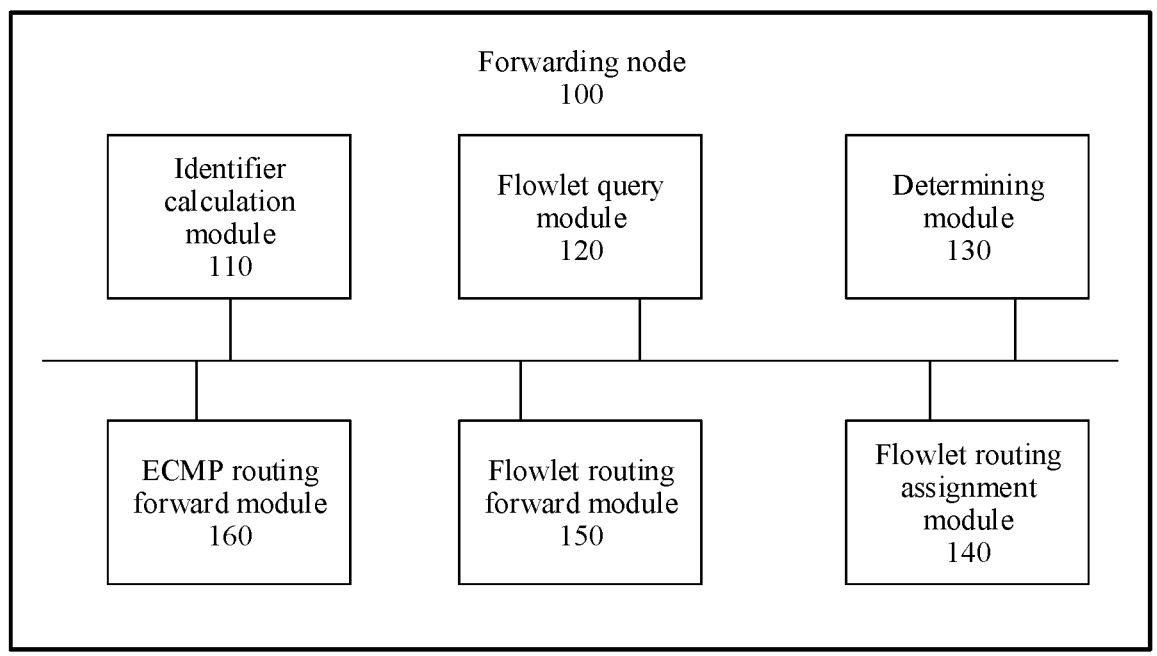
FIG. 1 is a schematic structural diagram of a forwarding node according to an embodiment of this application.

The following describes the technical solutions in this application with reference to the accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments of this application, the terms such as "example" and "such as" are used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, "corresponding (corresponding, relevant)" and "corresponding" may be interchangeably used sometimes. It should be noted that meanings expressed by the terms are consistent when differences are not emphasized.

In the embodiments of this application, sometimes a subscript such as $W_1$ may be written in an incorrect form such as W1. Expressed meanings are consistent when differences between them are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, the statements mean referring to "one or more but not all of the embodiments", unless otherwise specifically emphasized in other ways. The terms "include", "comprise", "have", and variants of the terms all mean "include but are not limited to", unless otherwise specifically emphasized in other ways.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a and b, a and c, b and c, or a, b, and c, where a, b, and c may be singular or plural.

Embodiments of this application provide a packet forwarding method. The method may be performed by a forwarding node or a component (for example, a chip or a circuit) in the forwarding node. For ease of description, in the following embodiments, the technical solutions in this application are described by using the forwarding node as an execution body.

The forwarding node may forward a packet based on a flowlet routing table or an ECMP routing table. Each flowlet entry in the flowlet routing table is created when a corresponding flow meets a large flow condition. Therefore, a flow to which a packet forwarded based on the flowlet routing table belongs meets the large flow condition. A flow to which a packet forwarded based on the ECMP routing table belongs does not meet the large flow condition. In other words, according to the method provided in the embodiments of this application, whether to forward a packet based on the flowlet routing table or the ECMP routing table may be determined based on whether a flow to which the packet belongs meets the large flow condition.

In network traffic, a flow is a group of packets having a same flow identifier (for example, a quintuple or a flow label). A large flow refers to a flow in which a quantity of packets exceeds a threshold. In a specific implementation, a group of packets in a flow in which a quantity of packets exceeds the threshold within a period of time is identified as a large flow. A flow meeting the large flow condition may be considered as a large flow, or may be considered as a large burst. Correspondingly, a flow that does not meet the large flow condition may be considered as a small flow, or may be considered as a small burst. The large flow may also be referred to as an elephant flow, and the small flow may also be referred to as a mice flow.

In the foregoing technical solution, flowlet-based load balancing may be performed only on a large flow that meets the large flow condition, and ECMP may be used to perform load balancing on a small flow that does not meet the large flow condition. This can reduce an entry resource used for flowlet-based load balancing, improve balance of multi-path load sharing, and effectively improve a traffic sharing effect of load balancing.

As described above, a flowlet entry in the flowlet routing table is created only when a flow to which a packet belongs meets the large flow condition. Therefore, in an initial phase (that is, when the forwarding node has just been deployed on a network and has not received any packet), the flowlet routing table is an empty routing table. As a quantity of packets received by the forwarding node increases, the forwarding node may determine a flow that meets the large flow condition, and create a corresponding flowlet entry in the flowlet routing table. In this way, after a new packet in a flow for which a corresponding flowlet entry has been created arrives at the forwarding node, how to process the packet may be determined based on the matched flowlet entry in the flowlet routing table.

FIG. 1 is a schematic structural diagram of a forwarding node according to an embodiment of this application. As shown in FIG. 1, the forwarding node 100 includes an identifier calculation module 110, a flowlet query module 120, a determining module 130, a flowlet routing assignment module 140, a flowlet routing forward module 150, and an ECMP routing forward module 160.

The following separately describes functions of the identifier calculation module 110, the flowlet query module 120, the determining module 130, the flowlet routing assignment module 140, the flowlet routing forward module 150, and the ECMP routing forward module 160.

(1) The Identifier Calculation Module 110

The identifier calculation module 110 is configured to calculate an identifier of a packet. Each time the forwarding node receives a packet, the identifier calculation module 110 calculates an identifier of the packet. For example, the identifier calculation module 110 may determine an identifier of a packet based on flow identity information of the packet. Flow identity information is information used to identify an identity of a flow. Flow identity information of different flows is different, and flow identity information of different packets in a same flow is the same.

The flow identity information may also be referred to as a flow identifier (flow ID).

For an internet protocol version 4 (IPv4) packet, flow identity information of the IPv4 packet may be a quintuple, to be specific, a source IP address, a destination IP address, a source port, a destination port, and a protocol type that are carried in a packet header. In some other embodiments, the flow identity information of the IPv4 packet may alternatively be a source IP address and a destination IP address. In some other embodiments, the flow identity information of the IPv4 packet may alternatively be a source IP address, a destination IP address, a source port, and a destination port.

For an internet protocol version 6 (IPv6) packet, flow identity information of the IPv6 packet may be a flow label. In some other embodiments, the flow identity information of the IPv6 packet may further include a source address and a destination address in addition to the flow label.

The identifier calculation module 110 may perform a hash operation on flow identity information of a packet to obtain an identifier of the packet. The identifier of the packet may be a hash value obtained by performing the hash operation on the flow identity information of the packet. An algorithm that may be used to calculate the hash value of the flow identity information of the packet may be a cyclic redundancy check 32 (CRC32), a message-digest algorithm 5 (MD5), a secure hash algorithm (SHA) (for example, SHA-0, SHA-2, or SHA-256), or the like. This is not limited in the embodiments of this application.

(2) The Flowlet Query Module 120

The flowlet query module 120 stores a flowlet routing table. Each flowlet entry in the flowlet routing table mainly includes the following fields: an identifier field, a valid information field, and a next-hop port field.

The identifier field in the flowlet entry includes an identifier. If an identifier of a packet is the same as an identifier included in an identifier field in a flowlet entry, it may be considered that the identifier matches the flowlet entry. In this case, how to process the packet may be further determined based on a valid information field and a next-hop port field in the matched flowlet entry.

In some embodiments, different flow identity information determines different identifiers. In this case, the flowlet entry in the flowlet routing table is in a one-to-one correspondence with a flow. In other words, different flowlet entries correspond to different flows, and a quantity of flowlet entries included in the flowlet routing table is the same as a quantity of matched flows.

In some other embodiments, different flow identity information may determine a same identifier. In this case, one flowlet entry may correspond to a plurality of flowlet flows. In other words, a quantity of flowlet entries included in the flowlet routing table may be less than a quantity of matched flows.

The valid information field in the flowlet entry is used to determine whether a matched packet can be forwarded through a next-hop port recorded in the next-hop port field in the flowlet entry.

In some embodiments, the valid information field may include a valid bit field and an aging flag field.

In some other embodiments, the valid information field may include a valid bit field and a timestamp field.

A value of the valid bit field may be 1 or 0.

If the value of the valid bit field in the flowlet entry is 1, it indicates that the flowlet entry is a valid routing entry. In this case, if the packet does not time out, the matched packet may be forwarded through the next-hop port recorded in the next-hop port field in the flowlet entry.

If the value of the valid bit field in the flowlet entry is 0, it indicates that the flowlet entry is not a valid routing entry. In this case, the flowlet entry cannot be used as a routing entry used to process the packet matching the flowlet entry. In this case, the flowlet routing assignment module 140 needs to re-assign a new next-hop port for the packet and set the valid bit field to 1.

In some embodiments, if the value of the valid bit field in the flowlet entry is 0, it indicates that the flowlet entry is a valid routing entry. If the value of the valid bit field in the flowlet entry is 1, it indicates that the flowlet entry is not a valid routing entry.

A value of the aging flag field may be 1 or 0. The aging flag field may be used to determine whether a flowlet to which a packet belongs is aged.

The flowlet query module 120 may maintain a timer. A time threshold T may be set for the timer. The time threshold T is a minimum interval for determining whether two packets belong to a same flowlet. The value of the aging flag field is determined based on whether an interval at which two packets are processed is greater than the time threshold T. When a valid bit is 1, an aging bit is set to 1 when any packet arrives. When the timer expires, if the aging bit is 0, it may be considered that a flowlet to which the packet belongs is aged. In this case, the valid bit is set to 0. If the aging bit is 1, the valid bit remains unchanged. The aging bit is always set to 0 after the timer expires.

It is assumed that a packet 1 and a packet 2 are two consecutive packets in a same flow received by the forwarding node 100, and time at which the packet 1 is processed is t1. It is assumed that the packet 1 is a previous packet of the packet 2. The flowlet query module 120 may start the timer at t1. t1. If the timer exceeds the time threshold T and the packet 2 is not processed, it may be considered that a flowlet to which the packet 2 belongs is aged. In this case, the value of the aging flag field and the value of the valid bit field in the flowlet entry may be set to 0. If the packet 2 has been processed before the timer exceeds the time threshold T, it may be considered that the flowlet to which the packet 2 belongs is not aged. In this case, the aging flag field in the flowlet entry is 1. The timer continues to count. When the timer reaches the time threshold T, the aging flag field in the flowlet entry is set to 0.

Processing time of a packet may be time at which the forwarding node 100 receives the packet, or time at which the identifier calculation module 110 obtains an identifier of the packet through calculation, or time at which the flowlet query module 120 obtains the packet. This is not limited in the embodiments of this application.

The timestamp field is used to record processing time of a previous packet. The timestamp field may be used to determine whether a flowlet to which a packet belongs is aged. When a valid bit is 1, processing time of a previous packet of a current packet recorded in the timestamp field may be subtracted from processing time of the current packet. If a subtraction result is greater than a preset time threshold, it may be considered that a flowlet to which the current packet belongs is aged, and the valid bit is set to 0. It indicates that the flowlet is no longer valid. If the subtraction result is less than or equal to the preset time threshold, it may be considered that the flowlet to which the current packet belongs is not aged, and a value of the valid bit remains 1.

The packet 1 and the packet 2 are further used as an example. It is assumed that T is still used to represent the time threshold, and t2 is used to represent processing time of the packet 2. The timestamp field records the processing time of the packet 1, namely, t1. It is assumed that the value of the valid bit is 1. If $t2-t1>T$, the valid bit is set to 0. If $t2-t1 \le T$, the value of the valid bit remains unchanged.

In conclusion, the value of the valid bit of the flowlet entry may be determined based on the value of the aging flag field or the value of the timestamp field. When the value of the valid bit field is 1, if it is determined, based on the aging flag field or the timestamp field, that the flowlet to which the packet belongs is aged, the value of the valid bit field may be set to 0. If it is determined, based on the aging flag field or the timestamp field, that the flowlet to which the packet belongs is not aged, the value of the valid bit field may remain unchanged.

If the value of the valid bit field is 0, it may be considered that the current packet and the previous packet of the current packet belong to different flowlets. For example, the current packet may be a first packet of a next flowlet of the flow, or a first packet of a flowlet of a flow with a same identifier.

(3) The Determining Module 130

The determining module 130 is configured to determine whether a flow to which a packet belongs meets a large flow condition.

In some embodiments, the determining module 130 may determine, by using a sliding window algorithm, whether a flow to which a packet belongs meets the large flow condition.

In some embodiments, the determining module 130 may store a sliding window counting bucket. The sliding window counting bucket may include at least one hash table. Each of the at least one hash table includes a plurality of statistical entries. Each of the plurality of statistical entries may include the following fields: an identifier field, a count value field, and a large flow flag field. The determining module 130 may obtain an identifier of a packet determined by the identifier calculation module 110, and determine whether a statistical entry (hereinafter referred to as a matched statistical entry) matching the packet exists in each of the at least one hash table. An identifier in an identifier field of the statistical entry matching the packet is the same as the identifier of the packet.

If only one hash table in the at least one hash table includes a matched statistical entry, a count value stored in a count value field of the matched statistical entry may be increased by 1, and then an updated count value (namely, the count value increased by 1) is compared with a preset threshold. If the updated count value is greater than the preset threshold, it may be determined that the flow to which the packet belongs meets the large flow condition. If the updated count value is not greater than the preset threshold, it may be determined that the flow to which the packet belongs does not meet the large flow condition.

If each of a plurality of hash tables in the at least one hash table includes a matched statistical entry, a count value stored in a count value field of a matched statistical entry in one hash table may be increased by 1, and then count values of all matched statistical entries are added. A result obtained after addition is compared with a preset threshold. If the result obtained after addition is greater than the preset threshold, it may be determined that the flow to which the packet belongs meets the large flow condition. If the result obtained after addition is not greater than the preset threshold, it may be determined that the flow to which the packet belongs does not meet the large flow condition.

For example, a hash table 1, a hash table 2, and a hash table 3 in the at least one hash table each include a matched statistical entry matching a packet, and count values in the hash table 1, the hash table 2, and the hash table 3 are respectively 16, 29, and 31. After the packet is received, the count value in the hash table 1 may be increased by 1. In this case, the count value in the hash table 1 becomes 17. Then, the count values in the hash table 2 and the hash table 3 and an updated count value in hash table 1 are added (that is, 29+31+17) and compared with the preset threshold.

When it is determined that a flow to which a packet belongs meets the large flow condition, a value of a large flow flag field in a statistical entry matching the packet may be changed to 1, to indicate that the flow to which the packet belongs is a large flow. If a flow to which a packet belongs does not meet the large flow condition, a value of a large flow flag field does not need to be changed, that is, the value of the large flow flag field remains as a default value 0, to indicate that the flow to which the packet belongs is a small flow.

In some embodiments, if no statistical entry matching the packet exists in the plurality of statistical entries, one statistical entry may be created. An identifier in an identifier field in the created statistical entry is an identifier of the packet. A count value in a count value field is 1. A value of a large flow flag field is 0, indicating that the flow to which the packet belongs is a small flow.

In some other embodiments, if no statistical entry matching the packet exists in the plurality of statistical entries, one statistical entry may be determined from the plurality of statistical entries. An identifier in an identifier field in the statistical entry is changed to the identifier of the packet. A value of a count value field is changed to 1. A value of a large flow flag field is set to 0, to indicate that the flow to which the packet belongs is a small flow. The determined statistical entry may be a statistical entry that does not match a packet for a long time.

In some embodiments, when it is determined that a flow to which a packet belongs meets the large flow condition, a value of a large flow flag field in a statistical entry matching the packet may be changed to 0, to indicate that the flow to which the packet belongs is a large flow. If a flow to which a packet belongs does not meet the large flow condition, a value of a large flow flag field does not need to be changed, that is, the value of the large flow flag field remains as a default value 1, to indicate that the flow to which the packet belongs is a small flow.

In some other embodiments, the statistical entry may include only an identifier field and a count value field. In this case, each time a packet is received, a count value in a matched statistical entry is increased by 1, and an updated count value (or a sum of count values of all matched statistical entries) is compared with the preset threshold. Whether a flow to which the packet belongs is a large flow is determined based on a comparison result.

In some other embodiments, the determining module 130 may use a count-mini sketch (CM-Sketch) to determine whether a flow to which a packet belongs meets the large flow condition.

A basic idea of using the CM-Sketch to determine whether a flow to which a packet belongs meets the large flow condition is as follows: There is an array with a length of n for counting, and an initial value of each element in the array is 0. The identifier of the packet determined by the identifier calculation module 110 is a number ranging from 0 to n. Therefore, the identifier of the packet may be used as an index of the element. The determining module 130 obtains the identifier of the packet determined by the identifier calculation module 110, and may find a plurality of elements in the array based on the identifier of the packet. The plurality of elements are in a one-to-one correspondence with a plurality of values, and a minimum value in the plurality values is a count value of the flow. The minimum value of the plurality of values is added by 1, and an updated value of an element (namely, a value of the element added by 1) is compared with a preset threshold. If the updated value of the element is greater than the preset threshold, it may be determined that the flow to which the packet belongs meets the large flow condition. If the value of the updated element is not greater than the preset threshold, it may be determined that the flow to which the packet belongs does not meet the large flow condition. If there is no element corresponding to the identifier of the packet in the array, it may be determined that the flow to which the packet belongs does not meet the large flow condition.

Optionally, in some embodiments, a timer may be set. When the timer expires, the sliding window count bucket or CM-Sketch-based array may be partially or completely cleared or aged.

Division into the units shown in FIG. 1 is logical function division, and there may also be another division manner. For example, large flow condition determining and flowlet query may be implemented by one function module. For example, a table used to determine whether the large flow condition is met may be combined with the flowlet routing table. For ease of description, a combined table may also be referred to as a flowlet routing table. The flowlet routing table may include an identifier field, a valid information field, and a next-hop port field. For specific functions of the identifier field, the valid information field, and the next-hop port field, refer to the foregoing content. The flowlet routing table may further include a count value field and a large flow flag field. The flowlet routing table may store some entries that do not meet the large flow condition. Values of large flow flag fields of these entries are negative values (for example, 0). In other words, values of a valid bit field and a large flow flag field of an entry that meets the large flow condition are 1. In this embodiment, an entry in the flowlet routing table may be replaced by an entry corresponding to a newly arrived packet. For example, the flowlet routing table is constructed by using a hash table, and a location of each entry in the flowlet routing table is obtained through hash calculation. When a location of the newly arrived packet is the same as that of an existing entry, if a valid bit of the entry is 0 or it is determined that a flow has aged, an entry generated by the newly arrived packet is used to replace the existing entry. In the foregoing example, only some entries that meet the large flow condition and created entries of some newly arrived flows (or flows that have been aged and deleted from the flowlet routing table) are stored. A large flow flag of the created entry may be 0, and a value of a large flow flag field of the entry is changed to 1 only when a count value used to determine whether the large flow condition is met exceeds a threshold.

(4) The Flowlet Routing Assignment Module 140

The flowlet routing assignment module 140 assigns a next-hop port for a packet.

In some embodiments, the flowlet routing assignment module 140 may determine the next-hop port for the packet based on a dynamic routing table. The dynamic routing table includes a plurality of dynamic entries. Each of the plurality of dynamic entries may include an identifier field and a next-hop port field. The identifier field may include an identifier, and the next-hop port field may include a plurality of next-hop ports. In some embodiments, the dynamic routing table may be stored on the forwarding node 100 or on another device (such as a storage device) communicating with the forwarding node.

The flowlet routing assignment module 140 may determine whether a dynamic entry matching a packet to which a next-hop port is to be assigned (for ease of description, "a packet to which a next-hop port is to be assigned" is referred to as a "to-be-assigned packet" for short hereinafter) exists in the plurality of dynamic entries. An identifier included in an identifier field in the dynamic entry matching the to-be-assigned packet is the same as an identifier of the to-be-assigned packet. If the dynamic entry (which may be referred to as a matched dynamic entry) matching the to-be-assigned packet exists, one of a plurality of next-hop ports included in a next-hop port field in the matched dynamic entry may be determined as a next-hop port assigned to the to-be-assigned packet. For ease of description, the next-hop port assigned for the to-be-assigned packet may be referred to as a target next-hop port. If no dynamic entry matching the to-be-assigned packet exists, the packet may be forwarded through a pre-configured default next-hop port.

Optionally, in some embodiments, the target next-hop port may be any one of the plurality of next-hop ports.

Optionally, in some other embodiments, the flowlet routing assignment module 140 may determine path quality of a transmission path corresponding to each of the plurality of next-hop ports, and select the target next-hop port based on the obtained path quality. For example, a next-hop port corresponding to a piece of path quality that meets a preset condition in the plurality of pieces of path quality may be determined as the target next-hop port.

The path quality may be reflected by one or more of a throughput, an end-to-end delay, a packet loss rate, or a jitter rate of a path. For example, the path quality may be a value of one or more of the throughput, the delay, the packet loss rate, or the jitter rate, or a path quality score obtained through calculation based on the value of the one or more of the throughput, the delay, the packet loss rate, or the jitter rate.

The preset condition may be set as required. For example, a next-hop port corresponding to a path with best path quality may be selected as the target next-hop port, for example, a next-hop port corresponding to a path with a minimum delay, a maximum throughput, a lowest packet loss rate, or a lowest jitter rate. For another example, a next-hop port corresponding to a path with a minimum delay may be selected, as the target next-hop port, from a plurality of paths with a same throughput. For another example, a next-hop port corresponding to a path with a maximum throughput in a plurality of paths whose delays meet a preset delay threshold may be selected as the target next-hop port.

Optionally, in some other embodiments, the flowlet routing assignment module 140 may select, as the target next-hop port, one of a plurality of next-hop ports in a plurality of flowlet entries included in the flowlet routing table stored by the flowlet query module 120. For example, a next-hop port with a least load may be selected as the target next-hop port.

(5) The Flowlet Routing Forward Module 150

The flowlet routing forward module 150 may forward a packet based on a next-hop port in a flowlet entry determined by the flowlet query module 120.

(6) The ECMP Routing Forward Module 160

The ECMP routing forward module 160 may store an ECMP routing table. The ECMP routing table may include a plurality of ECMP entries, and each of the plurality of ECMP entries may include an identifier field and a next-hop port field.

If a packet determined by the determining module 130 does not meet the large flow condition, the packet may be sent to the ECMP routing forward module 160. The ECMP routing forward module 160 may determine whether there is an ECMP entry matching the packet in the plurality of ECMP entries included in the ECMP routing table. If there is an ECMP entry matching the packet (hereinafter referred to as a matched ECMP entry), the packet is forwarded based on a next-hop port in a next-hop port field in the matched ECMP entry. If there is no ECMP entry matching the packet, the packet may be forwarded through a default next-hop port.

The ECMP routing table may be a static ECMP routing table. The static ECMP routing table may include a group table and a member table. A base address may be queried from the group table based on flow identity information of the packet. A next-hop port is determined, based on the queried base address and an offset value, from the member table to forward the packet. The offset value is determined based on the flow identity information of the packet. For example, the offset value may be determined based on a hash value of the flow identity information, or may be determined based on an identifier of the packet determined by the identifier calculation module 110. One base address corresponds to a plurality of offset values, and each of the plurality of offset values corresponds to one next-hop port.

The ECMP routing table may be a static ECMP routing table. The static ECMP routing table may include a group table and a member table. A base address may be queried from the group table based on flow identity information of the packet. A next-hop port is determined, based on the queried base address and an offset value, from the member table to forward the packet. The offset value is determined based on the flow identity information of the packet. For example, the offset value may be determined based on a hash value of the flow identity information, or may be determined based on an identifier of the packet determined by the identifier calculation module 110. One base address corresponds to a plurality of offset values, and each of the plurality of offset values corresponds to one next-hop port.

The ECMP routing table may be a static ECMP routing table. The static ECMP routing table may include a group table and a member table. A base address may be queried from the group table based on flow identity information of the packet. A next-hop port is determined, based on the queried base address and an offset value, from the member table to forward the packet. The offset value is determined based on the flow identity information of the packet. For example, the offset value may be determined based on a hash value of the flow identity information, or may be determined based on an identifier of the packet determined by the identifier calculation module 110. One base address corresponds to a plurality of offset values, and each of the plurality of offset values corresponds to one next-hop port.

After determining an identifier of a received packet, the forwarding node 100 may process the packet in two manners.

Processing manner 1: The determining module 130 first determines, based on the identifier of the packet, whether a flow to which the packet belongs meets the large flow condition. If the large flow condition is met, the flowlet query module 120 determines whether there is a matched flowlet entry, and determines, based on a determined result, to forward the packet based on the matched flowlet entry, a created flowlet entry, or an updated flowlet entry. If the large flow condition is not met, the ECMP routing forward module 160 forwards the packet based on a matched ECMP entry.

Processing manner 2: The flowlet query module 120 determines, based on the identifier of the packet, whether there is a matched flowlet entry in the flowlet routing table. If there is a matched flowlet entry, the packet is forwarded based on the matched flowlet entry or an updated flowlet entry. If there is no matched flowlet entry, the determining module 130 determines, based on the identifier of the packet, whether a flow to which the packet belongs meets the large flow condition. If the large flow condition is met, a flowlet entry is created, and the packet is forwarded based on the created flowlet entry. If the large flow condition is not met, the ECMP routing forward module 160 forwards the packet based on a matched ECMP entry.

Figure 2:
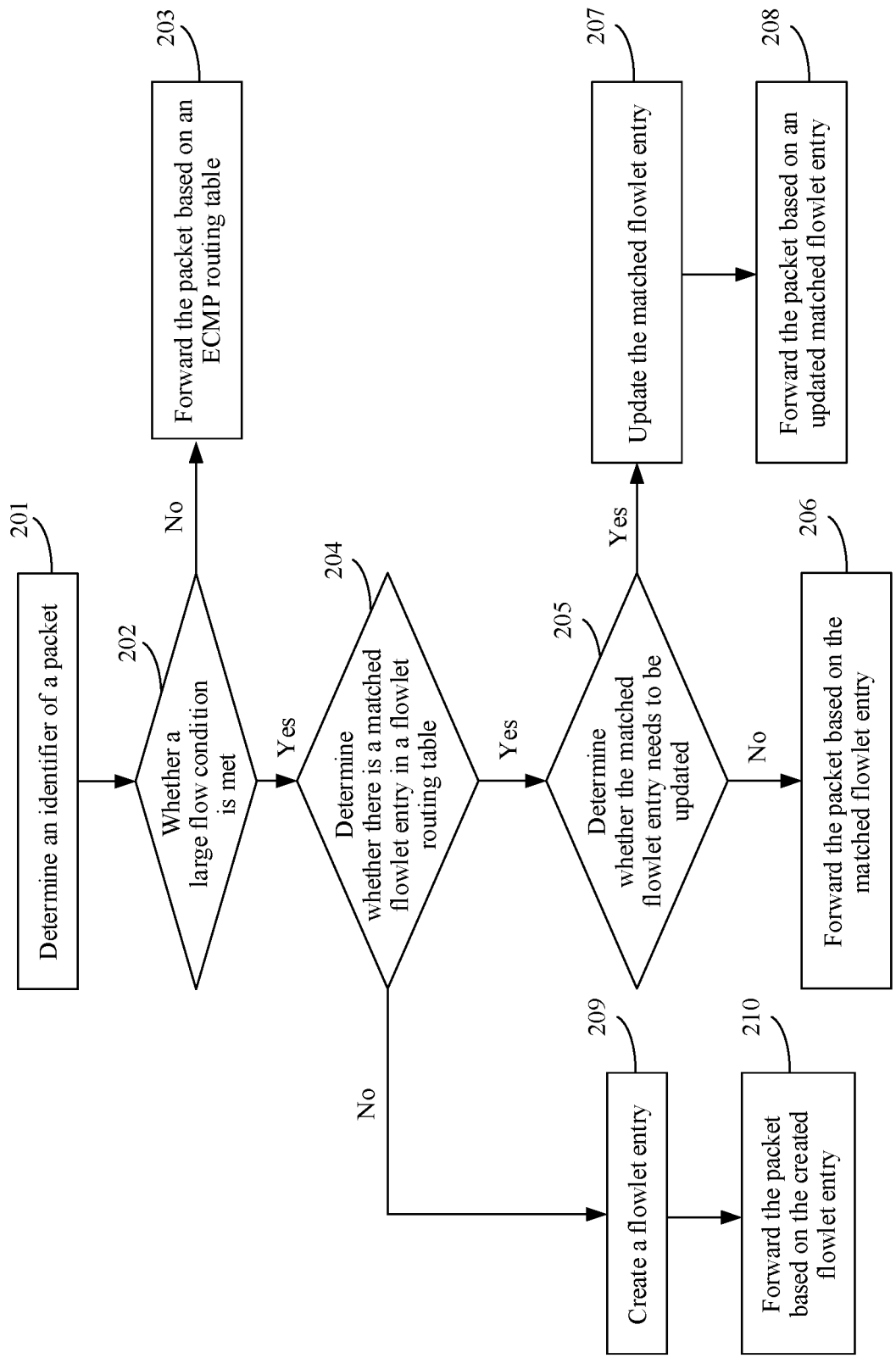
FIG. 2 is a flowchart of packet processing corresponding to a processing manner 1.

FIG. 2 is a flowchart of packet processing corresponding to the processing manner 1.

201: Determine, based on flow identity information of a packet, an identifier of the packet.

202: Determine, based on the identifier of the packet, whether a flow to which the packet belongs meets a large flow condition.

If the flow to which the packet belongs does not meet the large flow condition, operation 203 is performed. If the flow to which the packet belongs meets the large flow condition, operation 204 is performed.

203: Forward the packet based on an ECMP routing table.

204: Determine whether there is a flowlet entry matching the identifier of the packet in a flowlet routing table.

If there is a flowlet entry matching the identifier of the packet in the flowlet routing table, operation 205 is performed. If there is no flowlet entry matching the identifier of the packet in the flowlet routing table, operation 209 and operation 210 are performed.

205: Determine whether the matched flowlet entry needs to be updated.

If the matched flowlet entry does not need to be updated, step 206 may be performed. If the matched flowlet entry needs to be updated, operation 207 and operation 208 may be performed.

Whether the matched flowlet entry needs to be updated may be determined based on a valid information field (to be specific, a valid bit field and an aging flag field, or a valid bit field and a timestamp field) in the flowlet entry matching the identifier of the packet. As described above, when the valid bit field is 1, whether a flowlet to which the packet belongs is aged may be determined based on the aging flag field or the timestamp field. If a determined result is that the flowlet is aged, the valid bit field needs to be set to 0. In this case, it may be determined that the matched flowlet entry needs to be updated. If the determined result is that the flowlet is not aged, a value of the valid bit field remains unchanged. In this case, it may be determined that the matched flowlet entry does not need to be updated.

206: Forward the packet based on the matched flowlet entry.

207: Update the matched flowlet entry.

208: Forward the packet based on an updated matched flowlet entry.

209: Create a flowlet entry in the flowlet routing table.

210: Forward the packet based on the created flowlet entry.

Figure 3:
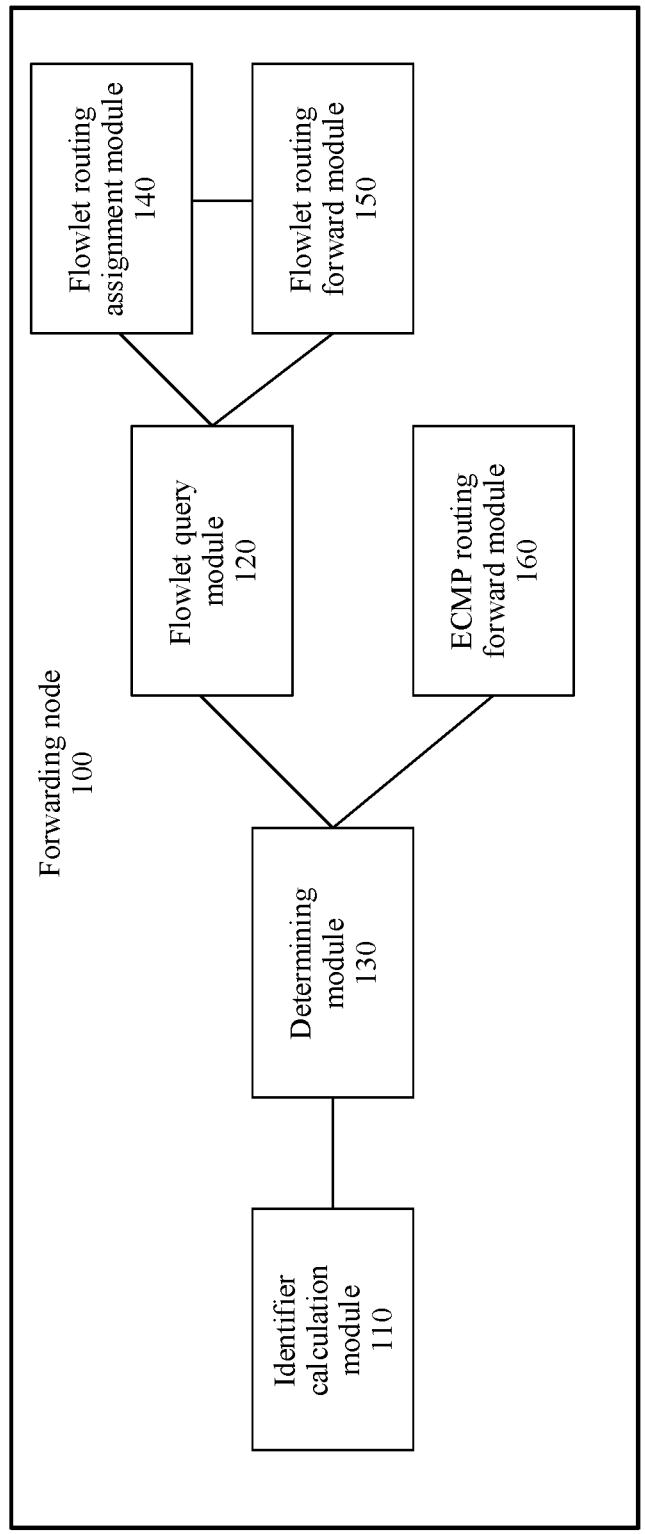
FIG. 3 is another schematic structural diagram of a forwarding node.

FIG. 3 is a schematic diagram of a relationship between the modules in the forwarding node 100 when the packet is processed in the processing manner 1.

As shown in FIG. 3, the identifier calculation module 110 may determine the identifier of the packet, and send the determined identifier of the packet to the determining module 130.

The determining module 130 determines whether the flow to which the packet belongs meets the large flow condition. If the large flow condition is met, the flowlet query module 120 processes the packet. If the large flow condition is not met, the ECMP routing forward module 160 forwards the packet based on the stored ECMP routing table.

The flowlet query module 120 determines whether there is a flowlet entry matching the packet in the stored flowlet routing table.

(1) If there is a matched flowlet entry and the matched flowlet entry does not need to be updated, the flowlet routing forward module 150 forwards the packet.

(2) If there is no matched flowlet entry, the flowlet routing assignment module 140 assigns a new next-hop port and creates a flowlet entry based on the assigned new next-hop port. Then, the flowlet routing forward module 150 forwards the packet based on the created flowlet entry.

(3) If there is a matched flowlet entry and the matched flowlet entry needs to be updated, the flowlet routing assignment module 140 assigns a new next-hop port and updates the matched flowlet entry based on the assigned new next-hop port. Then, the flowlet routing forward module 150 forwards the packet based on an updated matched flowlet entry.

Figure 4:
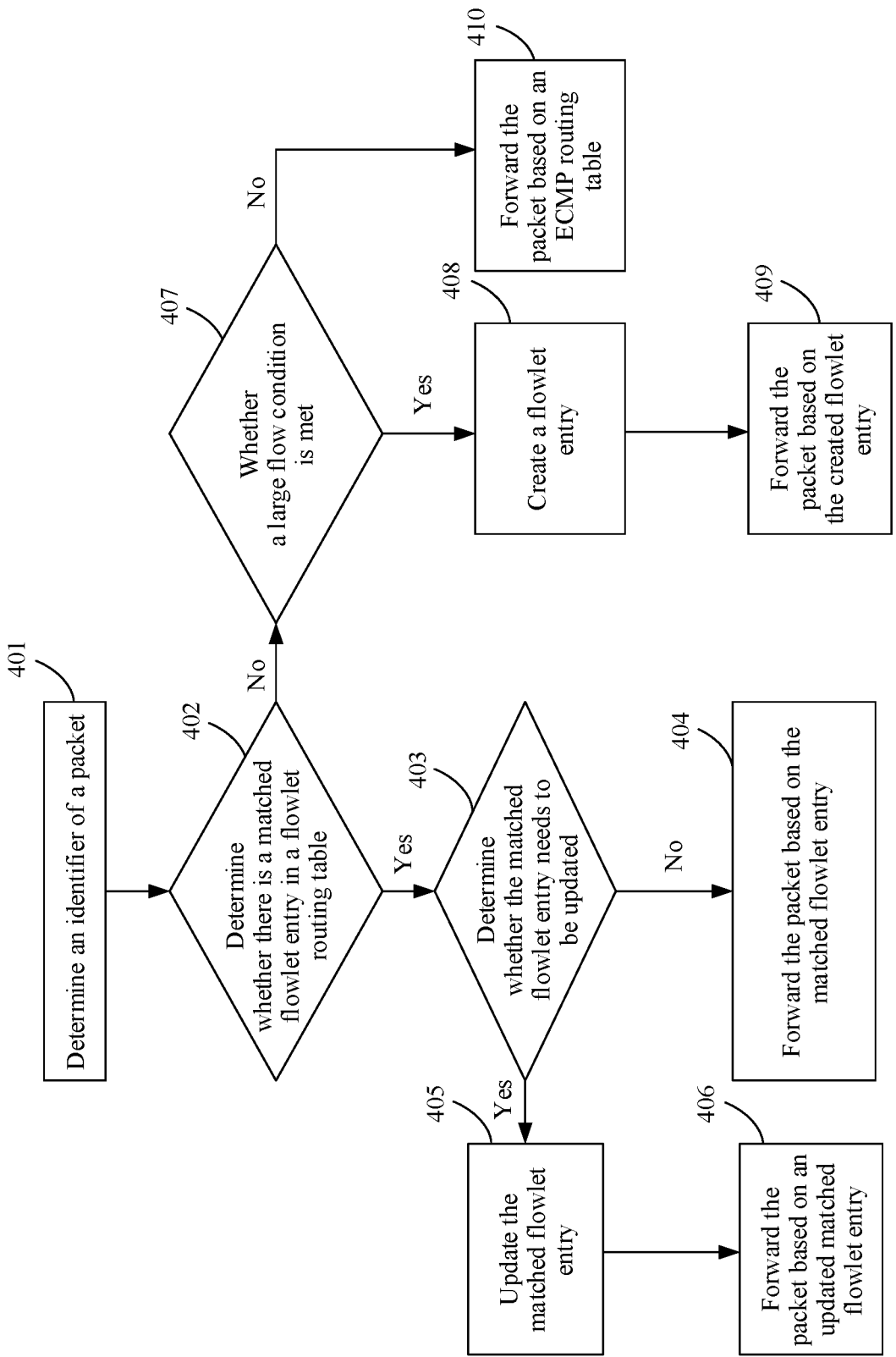
FIG. 4 is a flowchart of packet processing corresponding to a processing manner 2.

FIG. 4 is a flowchart of packet processing corresponding to the processing manner 2.

401: Determine, based on flow identity information of a packet, an identifier of the packet.

402: Determine whether there is a flowlet entry matching the identifier of the packet in a flowlet routing table.

If there is a flowlet entry matching the identifier of the packet in the flowlet routing table, operation 403 is performed. If there is no flowlet entry matching the identifier of the packet in the flowlet routing table, operation 407 is performed.

403: Determine whether the matched flowlet entry needs to be updated.

If the matched flowlet entry does not need to be updated, operation 404 may be performed. If the matched flowlet entry needs to be updated, operation 405 and operation 406 are performed.

404: Forward the packet based on the matched flowlet entry.

405: Update the matched flowlet entry.

406: Forward the packet based on an updated matched flowlet entry.

407: Determine whether a flow to which the packet belongs meets a large flow condition.

If the flow to which the packet belongs meets the large flow condition, operation 408 and operation 409 are performed. If the flow to which the packet belongs does not meet the large flow condition, operation 410 is performed.

408: Create a flowlet entry in the flowlet routing table.

409: Forward the packet based on the created flowlet entry.

410: Forward the packet based on an ECMP routing table.

Figure 5:
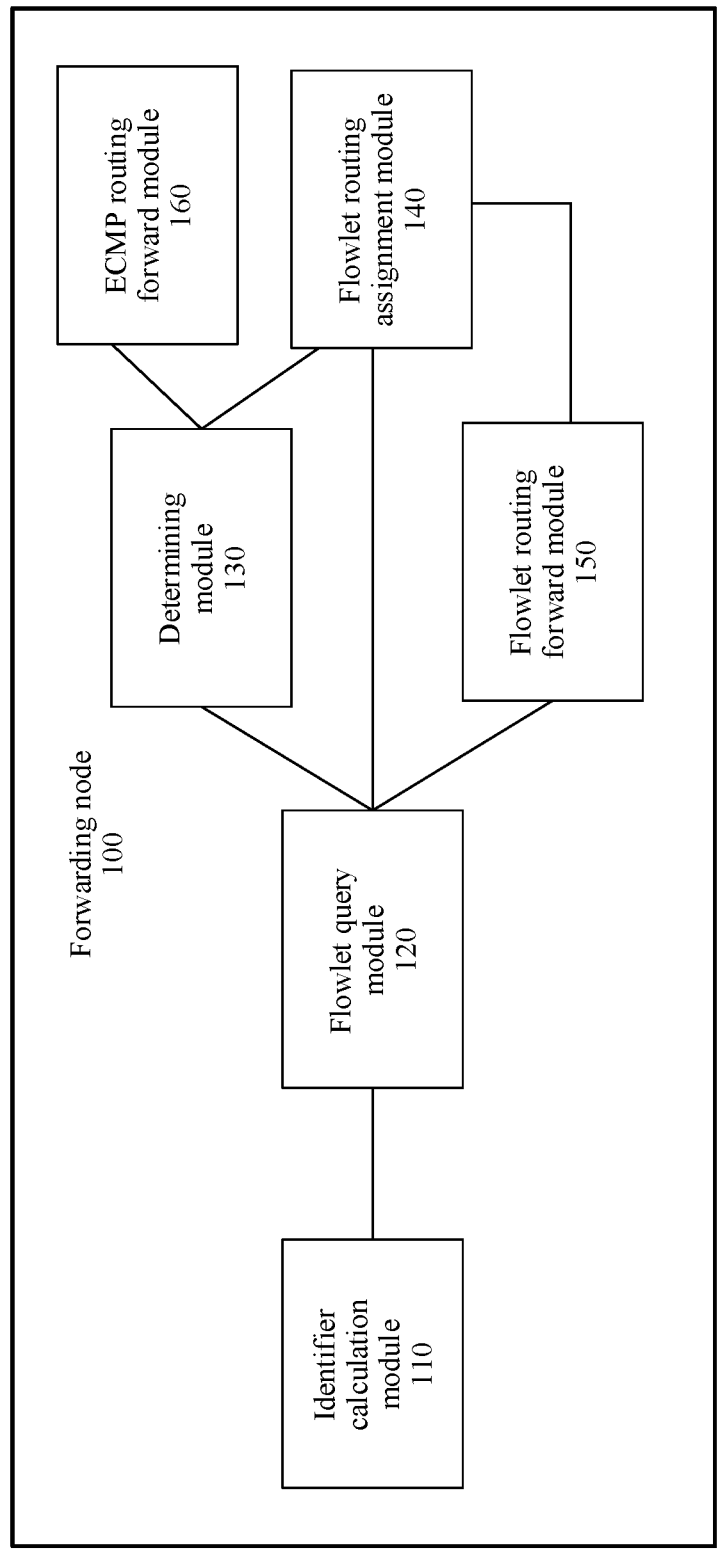
FIG. 5 is another schematic structural diagram of a forwarding node.

FIG. 5 is a schematic diagram of a relationship between the modules in the forwarding node 100 when the packet is processed in the processing manner 2.

As shown in FIG. 5, the identifier calculation module 110 may determine the identifier of the packet and send the identifier of the packet to the flowlet query module 120.

The flowlet query module 120 determines whether there is a flowlet entry matching the packet in the stored flowlet routing table.

(1) If there is a matched flowlet entry and the matched flowlet entry does not need to be updated, the flowlet routing forward module 150 forwards the packet.

(2) If there is a matched flowlet entry and the matched flowlet entry needs to be updated, the flowlet routing assignment module 140 assigns a new next-hop port and updates the matched flowlet entry based on the assigned new next-hop port. Then, the flowlet routing forward module 150 forwards the packet based on an updated matched flowlet entry.

(3) If there is no matched flowlet entry, the determining module 130 continues processing.

The determining module 130 determines whether the flow to which the packet belongs meets the large flow condition.

If the large flow condition is not met, the ECMP routing forward module 160 forwards the packet based on the stored ECMP routing table. If the large flow condition is met, the flowlet routing assignment module 140 assigns a new next-hop port and creates a new flowlet entry based on the assigned new next-hop port. Then, the flowlet routing forward module 150 forwards the packet based on the created flowlet entry.

To help a person skilled in the art understand the technical solutions in this application better, the following describes the technical solutions in this application with reference to specific embodiments.

For ease of description, a flow A, a flow B, and a flow C are used to represent three different flows received by the forwarding node 100. In other words, flow identity information of any two of the flow A, the flow B, and the flow C is different. A packet $A_1$ is used to represent a first packet in the flow A received by the forwarding node 100, a packet $A_2$ is used to represent a second packet in the flow A received by the forwarding node 100, a packet $A_3$ is used to represent a third packet in the flow A received by the forwarding node 100, and so on. Similarly, a packet $B_1$ is used to represent a first packet in the flow B received by the forwarding node 100, a packet $B_2$ is used to represent a second packet in the flow B received by the forwarding node 100, a packet $B_3$ is used to represent a third packet in the flow B received by the forwarding node 100, and so on. Similarly, a packet $C_1$ is used to represent a first packet in the flow C received by the forwarding node 100, a packet $C_2$ is used to represent a second packet in the flow C received by the forwarding node 100, a packet $C_3$ is used to represent a third packet in the flow C received by the forwarding node 100, and so on.

The packet $A_1$, the packet $A_2$, the packet $A_3$, ..., and a packet $A_X$ are all packets in the flow A (where X is a positive integer greater than 3). Therefore, flow identity information of any two packets from the packet $A_1$ to the packet $A_X$ is the same, and $ID_A$ may be used to represent an identifier determined based on the flow identity information of the packets in the flow A.

Similarly, the packet $B_1$, the packet $B_2$, the packet $B_3$, ..., and a packet $B_Y$ are all packets in the flow B (where Y is a positive integer greater than 3). Therefore, flow identity information of any two packets from the packet $B_1$ to the packet $B_Y$ is the same, and $ID_B$ may be used to represent an identifier determined based on the flow identity information of the packets in the flow B.

Similarly, the packet $C_1$, the packet $C_2$, the packet $C_3$, ..., and a packet $C_Z$ are all packets in the flow C (where Z is a positive integer greater than 3). Therefore, flow identity information of any two packets from the packet $C_1$ to the packet $C_Z$ is the same, and $ID_C$ may be used to represent an identifier determined based on the flow identity information of the packets in the flow C.

It is assumed that the forwarding node 100 is in an initial state when accessing a network. In other words, the forwarding node 100 has not received any packet before. In this case, the flowlet routing table stored by the flowlet query module 120 of the forwarding node 100 is an empty routing table. For ease of description, in the following, it is assumed that fields included in a flowlet entry in the flowlet routing table are: an identifier field, a valid bit field, an aging flag field, and a next-hop port field. A hash table in a sliding window counting bucket or an array in a CM-Sketch that is used by the determining module 130 to determine whether a flow meets the large flow condition is also empty. For ease of description, in the following, it is assumed that the determining module 130 determines, based on the sliding window counting bucket, whether the flow to which the packet belongs meets the large flow condition and that a flow whose count value is greater than or equal to 100 is considered as a large flow. The ECMP routing table stored in the ECMP routing forward module 160 may be an ECMP routing table in which a next-hop port field is preset, and the ECMP routing table includes a group table and a member table. In other words, in this case, the flowlet routing table, the sliding window counting bucket, and the ECMP routing table are respectively shown in Table 1, Table 2, and Table 3. For ease of description, Table 3 shows only the member table in the ECMP routing table.

TABLE 1

| Identifier | Valid bit | Aging flag | Next-hop port |
|---|---|---|---|
| | | | |

TABLE 2

| Identifier | Count value | Large flow flag |
|---|---|---|
| | | |

TABLE 3

| Base address | Offset value | Next-hop port |
|---|---|---|
| $Base_0$ | $Offset_A$ | Port 1 |
| | $Offset_B$ | Port 2 |
| | $Offset_C$ | Port 3 |

As described above, Table 1 (namely, the flowlet routing table) is an empty routing table, Table 2 (namely, the sliding window counting bucket) is also an empty table, and Table 3 (namely, the member table in the ECMP routing table) is a routing table in which the next-hop ports are configured.

It is assumed that the forwarding node 100 receives the packet $A_1$, and the packet $A_1$ is a first packet received by the forwarding node 100.

It is assumed that the forwarding node 100 processes the packet according to a procedure shown in FIG. 2. In this case, the forwarding node 100 may determine, based on the sliding window counting bucket shown in Table 2, whether the flow to which the packet $A_1$ belongs meets the large flow condition. Because there is no data in the sliding window counting bucket, related information of the packet $A_1$ may be added to the sliding window counting bucket, to obtain a sliding window counting bucket shown in Table 4.

TABLE 4

| Identifier | Count value | Large flow flag |
|---|---|---|
| $ID_A$ | 1 | 0 |

As shown in Table 4, the forwarding node 100 receives only one packet whose identifier is $ID_A$, and therefore, a count value is 1. As described above, a flow whose count value is greater than or equal to 100 is considered a large flow. Because currently the count value is only 1, a large flow flag is 0. In other words, the flow to which the packet $A_1$ belongs is not a large flow.

In this case, the forwarding node 100 may forward the packet $A_1$ based on the ECMP routing table. It is assumed that the flow identity information of the packet in the flow A is $Base_0$. It is assumed that an offset value determined based on the flow identity information of the packet in the flow A is $Offset_A$. In this case, it may be determined, based on Table 3, that a next-hop port for the packet $A_1$ is a port 1. It is assumed that the forwarding node 100 processes the packet according to a procedure shown in FIG. 4. In this case, the forwarding node 100 needs to first determine whether there is a flowlet entry whose identifier in an identifier field is $ID_A$ in a current flowlet routing table, namely, a flowlet entry matching the packet $A_1$. As shown in Table 1, the current flowlet routing table is an empty routing table. Therefore, there is no flowlet entry matching the packet $A_1$. In this case, the forwarding node 100 may determine whether the flow to which the packet $A_1$ belongs meets the large flow condition. A specific process in which the forwarding node 100 may determine whether the flow to which the packet $A_1$ belongs meets the large flow condition and a subsequent procedure are the same as corresponding operations in which the forwarding node processes the packet according to the procedure shown in FIG. 2. For brevity, details are not described herein again.

It is assumed that the forwarding node 100 receives the packet $B_1$, and the packet $B_1$ is a second packet received by the forwarding node 100.

It is assumed that the forwarding node 100 processes the packet according to the procedure shown in FIG. 2. In this case, the forwarding node 100 may determine, based on the sliding window counting bucket shown in Table 2, whether the flow to which the packet $B_1$ belongs meets the large flow condition. Because the sliding window counting bucket does not include an entry matching the flow to which the packet $B_1$ belongs, the entry matching the flow to which the packet $B_1$ belongs may be created, to obtain a sliding window counting bucket shown in Table 5.

TABLE 5

| Identifier | Count value | Large flow flag |
|---|---|---|
| $ID_A$ | 1 | 0 |
| $ID_B$ | 1 | 0 |

As shown in Table 5, the forwarding node 100 receives only one packet whose identifier is $ID_B$, and therefore, a count value is 1. As described above, a flow whose count value is greater than or equal to 100 is considered a large flow. Because currently the count value is only 1, a large flow flag is 0. In other words, the flow to which the packet $B_1$ belongs is not a large flow.

In this case, the forwarding node 100 may forward the packet $B_1$ based on the ECMP routing table. It is assumed that a base address determined based on the flow identity information of the packet in the flow B is also $Base_0$. It is assumed that an offset value determined based on the flow identity information of the packet in the flow B is $Offset_B$. In this case, it may be determined, based on Table 3, that a next-hop port for the packet $B_1$ is the port 2.

It is assumed that the forwarding node 100 processes the packet according to the procedure shown in FIG. 4. In this case, the forwarding node 100 needs to first determine whether there is a flowlet entry whose identifier in an identifier field is $ID_B$ in the current flowlet routing table, namely, a flowlet entry matching the packet $B_1$. As shown in Table 1, the current flowlet routing table is an empty routing table. Therefore, there is no flowlet entry matching the packet $B_1$. In this case, the forwarding node 100 may determine whether the flow to which the packet $B_1$ belongs meets the large flow condition. A specific process in which the forwarding node 100 may determine whether the flow to which the packet $B_1$ belongs meets the large flow condition and a subsequent procedure are the same as corresponding operations in which the forwarding node processes the packet according to the procedure shown in FIG. 2. For brevity, details are not described herein again.

It is assumed that the forwarding node 100 receives the packet $C_1$, and the packet $C_1$ is a third packet received by the forwarding node 100. A manner in which the forwarding node 100 processes the packet $C_1$ is similar to manners in which the forwarding node 100 processes the packet $A_1$ and the packet $B_1$. For brevity, details are not described herein again. After the packet $C_1$ is processed, the sliding window counting bucket may be updated, as shown in Table 6.

TABLE 6

| Identifier | Count value | Large flow flag |
|---|---|---|
| $ID_A$ | 1 | 0 |
| $ID_B$ | 1 | 0 |
| $ID_C$ | 1 | 0 |

It is assumed that the forwarding node 100 successively receives the packet $A_2$ to a packet $A_{99}$, the packet $B_2$ to a packet $B_{86}$, and the packet $C_2$ to a packet $C_{16}$. In this case, the sliding window counting bucket is updated, as shown in Table 7.

TABLE 7

| Identifier | Count value | Large flow flag |
|---|---|---|
| $ID_A$ | 99 | 0 |
| $ID_B$ | 86 | 0 |
| $ID_C$ | 16 | 0 |

It can be learned that, so far, count values corresponding to the flow A, the flow B, and the flow C are not greater than or equal to the preset threshold 100. Therefore, the flow A, the flow B, and the flow C all do not meet the large flow condition, and corresponding large flow flags are 0. The packets $A_2$ to $A_{99}$, the packets $B_2$ to $B_{86}$, and the packet $C_2$ to $C_{16}$ are all forwarded based on the ECMP routing table shown in Table 3.

It is assumed that the forwarding node 100 receives a packet $A_{100}$, and the forwarding node 100 processes the packet $A_{100}$ according to the procedure shown in FIG. 2. In this case, the forwarding node 100 updates Table 7, as shown in Table 8.

TABLE 8

| Identifier | Count value | Large flow flag |
|---|---|---|
| $ID_A$ | 100 | 1 |
| $ID_B$ | 86 | 0 |
| $ID_C$ | 16 | 0 |

As shown in Table 8, after the packet $A_{100}$ is received, a count value of an entry (namely, an entry whose identifier field is $ID_A$) corresponding to the flow to which the packet $A_{100}$ belongs is equal to the preset threshold. Therefore, the large flow flag may be set to 1. In this case, the flow A is considered to meet the large flow condition.

The forwarding node 100 determines whether the flowlet routing table includes a flowlet entry matching the packet $A_{100}$ (namely, a flowlet entry whose identifier in an identifier field is $ID_A$). Because the flow A is a first flow that is determined to meet the large flow condition, no flowlet entry is created before. Therefore, so far, the flowlet routing table is still an empty routing table. In this case, the flowlet routing table does not include the flowlet entry matching the packet $A_{100}$. Therefore, the flowlet entry matching the packet $A_{100}$ may be created in the flowlet routing table. Because the packet $A_{100}$ is a packet in the flow A, the flowlet entry matching the packet $A_{100}$ may alternatively be considered as a flowlet entry matching the flow A. It is assumed that a determined next-hop port used to forward the flow A is a port 11. In this case, the flowlet routing table shown in Table 1 may be updated, as shown in Table 9. A value of an aging flag field in Table 9 is a value of the aging flag field before the timer expires.

TABLE 9

| Identifier | Valid bit | Aging flag | Next-hop port |
|---|---|---|---|
| $ID_A$ | 1 | 1 | Port 11 |

In this case, the forwarding node 100 may forward the packet $A_{100}$ based on the created flowlet entry.

It is assumed that the forwarding node 100 receives a packet $A_{100}$, and it is assumed that the forwarding node 100 processes the packet $A_{100}$ according to the procedure shown in FIG. 4. In this case, the forwarding node 100 determines whether the flowlet routing table includes a flowlet entry matching the packet $A_{100}$ (namely, a flowlet entry whose identifier in an identifier field is $ID_A$). So far, no flow A has been determined as a flow that meets the large flow condition. Therefore, so far, the flowlet routing table is still an empty routing table. In this case, the flowlet routing table does not include the flowlet entry matching the packet $A_{100}$.

The forwarding node 100 continues to determine whether the flow A meets the large flow condition. After receiving the packet $A_{100}$, the forwarding node 100 updates Table 7, as shown in Table 8. As shown in Table 8, after the packet $A_{100}$ is received, a count value of an entry (namely, an entry whose identifier field is $ID_A$) corresponding to the flow to which the packet $A_{100}$ belongs is equal to the preset threshold. Therefore, the large flow flag may be set to 1. In this case, the flow A is considered to meet the large flow condition. In this case, the forwarding node 100 may create the flowlet entry matching the packet $A_{100}$ in the flowlet routing table. It is assumed that a determined next-hop port used to forward the flow A is a port 11. In this case, the flowlet routing table shown in Table 1 may be updated, as shown in Table 9. The forwarding node 100 may forward the packet $A_{100}$ based on the created flowlet entry.

It is assumed that the forwarding node 100 also receives a packet $A_{101}$, and the packet $A_{101}$ does not time out (in other words, the packet $A_{101}$ and the packet $A_{100}$ belong to a same flowlet).

If the forwarding node 100 processes the packet $A_{101}$ according to the procedure shown in FIG. 2, the forwarding node 100 first updates an entry corresponding to the flow A in the sliding window counting bucket, to obtain a table shown in Table 10.

TABLE 10

| Identifier | Count value | Large flow flag |
|---|---|---|
| $ID_A$ | 101 | 1 |
| $ID_B$ | 86 | 0 |
| $ID_C$ | 16 | 0 |

As shown in Table 10, a large flow flag of the entry corresponding to the flow A is 1. In this case, the flow A is considered to meet the large flow condition.

The forwarding node 100 determines whether the flowlet routing table includes a flowlet entry matching the packet $A_{101}$ (namely, a flowlet entry whose identifier in an identifier field is $ID_A$). It is assumed that the packet $A_{101}$ does not time out, a flowlet routing table used to determine whether the flowlet entry matching the packet $A_{101}$ is included is a routing table shown in Table 9. As shown in Table 9, the flowlet routing table includes the flowlet entry whose identifier in the identifier field is $ID_A$, and both a valid bit and an aging flag are 1. In this case, the forwarding node 100 may forward the packet $A_{101}$ based on the flowlet entry matching the packet $A_{101}$.

If the forwarding node 100 processes the packet $A_{101}$ according to the procedure shown in FIG. 4, the forwarding node 100 determines whether the flowlet routing table includes a flowlet entry matching the packet $A_{101}$ (namely, a flowlet entry whose identifier in an identifier field is $ID_A$). It is assumed that the packet $A_{101}$ does not time out, a flowlet routing table used to determine whether the flowlet entry matching the packet $A_{100}$ is included is a routing table shown in Table 9. As shown in Table 9, the flowlet routing table includes the flowlet entry whose identifier in the identifier field is $ID_A$, and both a valid bit and an aging flag are 1. In this case, the forwarding node 100 may determine that the packet $A_{101}$ is not a first packet of a new flowlet. Therefore, the forwarding node 100 may forward the packet $A_{101}$ based on the flowlet entry matching the packet $A_{101}$.

It is assumed that the forwarding node 100 successively receives a packet $A_{102}$ to a packet $A_{120}$, a packet $B_{87}$ to a packet $B_{122}$, and a packet $C_{17}$ to a packet $C_{86}$. In this case, the sliding window count bucket is updated, as shown in Table 11.

TABLE 11

| Identifier | Count value | Large flow flag |
|---|---|---|
| $ID_A$ | 120 | 1 |
| $ID_B$ | 122 | 1 |
| $ID_C$ | 86 | 0 |

The flowlet routing table is updated, as shown in Table 12. A value of an aging flag field in Table 12 is a value of the aging flag field before the timer expires.

TABLE 12

| Identifier | Valid bit | Aging flag | Next-hop port |
|---|---|---|---|
| $ID_A$ | 1 | 1 | Port 11 |
| $ID_B$ | 1 | 0 | Port 12 |

It is assumed that the forwarding node 100 receives a packet $B_{123}$ and the packet $B_{123}$ times out. It is assumed that the forwarding node 100 processes the packet $B_{123}$ according to the procedure shown in FIG. 2. In this case, the forwarding node 100 may determine that the flow B to which the packet $B_{123}$ belongs meets the large flow condition. The forwarding node 100 determines whether there is a matched flowlet entry in the flowlet routing table shown in Table 12. There is a matched flowlet entry in the flowlet routing table shown in Table 12. However, as shown in Table 12, the value of the aging flag field is 0. Therefore, a value of the valid bit in Table 12 needs to be set to 0. In this case, the matched flowlet entry needs to be updated, and a new next-hop port needs to be reassigned for the flow B. It is assumed that the new next-hop port reassigned for flow B is a port 18. In this case, a flowlet entry matching the flow B in the flowlet routing table shown in Table 12 needs to be updated, to obtain a flowlet routing table shown in Table 13. A value of an aging flag field in Table 13 is a value of the aging flag field before the timer expires.

TABLE 13

| Identifier | Valid bit | Aging flag | Next-hop port |
|---|---|---|---|
| $ID_A$ | 1 | 1 | Port 11 |
| $ID_B$ | 1 | 1 | Port 18 |

In this case, the forwarding node 100 may forward the packet $B_{123}$ through the port 18 based on an updated flowlet entry matching the flow B.

The forwarding node in the embodiments of this application may be a network device (for example, a switch or a router) having an IP packet forwarding function. The steps implemented by the forwarding node may alternatively be implemented by a component in the network device, for example, may be implemented by a chip system in the network device. The chip system includes a logic circuit. The logic circuit may be coupled to an input/output interface, and transmit a packet through the input/output interface, to implement the operations in the foregoing method embodiments. The logic circuit may be a field programmable gate array (FPGA), an application-specific integrated circuit (ASIC), a network processor (NP), another programmable logic device, a discrete gate or a transistor logic device, a discrete hardware component, another integrated chip, or the like.

In an embodiment, operations in the foregoing method can be implemented by using a hardware integrated logical circuit in a processor, or by using instructions in a form of software. The operations of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the operations in the foregoing method in combination with hardware of the processor. To avoid repetition, details are not described herein again.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification includes but is not limited to these and any memory of another proper type.

According to the method provided in the embodiments of this application, this application further provides a computer program product. The computer program product includes computer program code. When the computer program code is run on a network device, the network device is enabled to perform the method in any one of the foregoing embodiments.

According to the method provided in the embodiments of this application, this application further provides a computer-readable medium. The computer-readable medium stores program code. When the program code is run on a network device, the network device is enabled to perform the method in any one of the foregoing embodiments.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet forwarding method, comprising:
   determining a first identifier of a first packet based on flow identity information of the first packet, wherein the first packet belongs to a first flow; and
   when the first flow is a large flow and a flowlet routing table does not comprise a first flowlet entry corresponding to the first flow, creating the first flowlet entry in the flowlet routing table, and forwarding the first packet based on the first flowlet entry, wherein the first flowlet entry comprises the first identifier;
   wherein the creating the first flowlet entry comprises:
      determining a first dynamic entry from a dynamic routing table based on the first identifier, wherein an identifier field of the first dynamic entry comprises the first identifier; and
      determining a first next-hop port in a plurality of next-hop ports comprised in the first dynamic entry, wherein the first next-hop port is a next-hop port comprised in a next-hop port field in the first flowlet entry;
   wherein the determining the first next-hop port in the plurality of next-hop ports comprised in the first dynamic entry comprises:
   obtaining a plurality of pieces of path quality, wherein the plurality of pieces of path quality are in a one-to-one correspondence with the plurality of next-hop ports; and
   determining a next-hop port corresponding to a piece of path quality that meets a preset condition in the plurality of pieces of path quality as the first next-hop port.

2. The method according to claim 1, wherein the flowlet routing table comprises at least one flowlet entry, and the at least one flowlet entry is in a one-to-one correspondence with at least one flow.

3. The method according to claim 2, wherein the at least one flowlet entry is a valid entry in the flowlet routing table.

4. The method according to claim 1, wherein the method further comprises:
   determining a second identifier of a second packet based on flow identity information of the second packet, wherein the second packet includes a second flow; and
   when the second flow is not a large flow, forwarding the second packet based on the second identifier and an equal-cost multi-path routing (ECMP) routing table.

5. The method according to claim 4, wherein the method further comprises:
   receiving a third packet;
   determining a third identifier of the third packet based on flow identity information of the third packet, wherein the third packet includes a third flow;
   determining, based on the third identifier, whether the flowlet routing table comprises a third flowlet entry, wherein the third flowlet entry comprises the third identifier; and
   if the flowlet routing table comprises the third flowlet entry, forwarding the third packet based on the third flowlet entry, or
   if the flowlet routing table does not comprise the third flowlet entry, determining whether the third flow is a large flow, and based on a determined result, creating the third flowlet entry in the flowlet routing table or forwarding the third packet based on the ECMP routing table.

6. The method according to claim 4, wherein the method further comprises:
   receiving a fourth packet;
   determining a fourth identifier of the fourth packet based on flow identity information of the fourth packet, wherein the fourth packet includes a fourth flow;
   determining whether the fourth flow is a large flow; and
   when the fourth flow is a large flow, forwarding the fourth packet based on a fourth flowlet entry in the flowlet routing table, wherein the fourth flowlet entry comprises the fourth identifier, or
   when the fourth flow is not a large flow, forwarding the fourth packet based on the ECMP routing table.

7. A network device, comprising:
   a processor, wherein the processor is configured to execute program instructions to perform operations comprising:
   determining a first identifier of a first packet based on flow identity information of the first packet, wherein the first packet belongs to a first flow;
   determining whether the first flow to which the first packet belongs is a large flow;
   when the first flow is a large flow and a flowlet routing table does not comprise a first flowlet entry corresponding to the first flow, creating the first flowlet entry in the flowlet routing table based on a next-hop port determined by a flowlet routing assignment module, wherein the first flowlet entry comprises the first identifier; and
   forwarding the first packet based on the first flowlet entry;
   wherein the creating the first flowlet entry comprises:
      determining a first dynamic entry from a dynamic routing table based on the first identifier, wherein an identifier field of the first dynamic entry comprises the first identifier; and
      determining a first next-hop port in a plurality of next-hop ports comprised in the first dynamic entry, wherein the first next-hop port is a next-hop port comprised in a next-hop port field in the first flowlet entry;
   wherein the determining the first next-hop port in the plurality of next-hop ports comprised in the first dynamic entry comprises:
   obtaining a plurality of pieces of path quality, wherein the plurality of pieces of path quality are in a one-to-one correspondence with the plurality of next-hop ports; and determining a next-hop port corresponding to a piece of path quality that meets a preset condition in the plurality of pieces of path quality as the first next-hop port.

8. The network device according to claim 7, wherein the flowlet routing table comprises at least one flowlet entry, and the at least one flowlet entry is in a one-to-one correspondence with at least one flow.

9. The network device according to claim 8, wherein the at least one flowlet entry is a valid entry in the flowlet routing table.

10. The network device according to claim 7, wherein the operations further comprise:
  determining a second identifier of a second packet based on flow identity information of the second packet, wherein the second packet includes a second flow;
  determining that the second flow is not a large flow; and
  when the second flow is not a large flow, forwarding the second packet based on the second identifier and an equal-cost multi-path routing (ECMP) routing table in the network device.

11. The network device according to claim 10, wherein the operations further comprise:
  determining a third identifier of a third packet based on flow identity information of the third packet, wherein the third packet includes a third flow;
  determining, based on the third identifier, whether the flowlet routing table comprises a third flowlet entry, wherein the third flowlet entry comprises the third identifier;
  when the flowlet routing table comprises the third flowlet entry, forwarding the third packet based on the third flowlet entry;
  when the flowlet routing table does not comprise the third flowlet entry, determining whether the third flow is a large flow; and
  creating the third flowlet entry in the flowlet routing table based on a determined result and the next-hop port determined by the flowlet routing assignment module, or forwarding the third packet based on a determined result and the ECMP routing table.

12. The network device according to claim 10, wherein the operations further comprise:
  determining a fourth identifier of a fourth packet based on flow identity information of the fourth packet, wherein the fourth packet includes a fourth flow;
  determining whether the fourth flow is a large flow; and
  when the fourth flow is a large flow, forwarding the fourth packet based on a fourth flowlet entry in the flowlet routing table, wherein the fourth flowlet entry comprises the fourth identifier, or when the fourth flow does not meet a large flow condition, forwarding the fourth packet based on the ECMP routing table.

13. A chip system, comprising:
  a logic circuit, wherein the logic circuit is configured to be coupled to an input/output interface, and transmit data through the input/output interface to perform operations comprising:
  determining a first identifier of a first packet based on flow identity information of the first packet, wherein the first packet belongs to a first flow; and
  when the first flow is a large flow and a flowlet routing table does not comprise a first flowlet entry corresponding to the first flow, creating the first flowlet entry in the flowlet routing table, and forwarding the first packet based on the first flowlet entry, wherein the first flowlet entry comprises the first identifier;
  wherein the creating the first flowlet entry comprises:
    determining a first dynamic entry from a dynamic routing table based on the first identifier, wherein an identifier field of the first dynamic entry comprises the first identifier; and
    determining a first next-hop port in a plurality of next-hop ports comprised in the first dynamic entry, wherein the first next-hop port is a next-hop port comprised in a next-hop port field in the first flowlet entry;
  wherein the determining the first next-hop port in the plurality of next-hop ports comprised in the first dynamic entry comprises:
    obtaining a plurality of pieces of path quality, wherein the plurality of pieces of path quality are in a one-to-one correspondence with the plurality of next-hop ports; and
    determining a next-hop port corresponding to a piece of path quality that meets a preset condition in the plurality of pieces of path quality as the first next-hop port.

14. The chip system according to claim 13, wherein the flowlet routing table comprises at least one flowlet entry, and the at least one flowlet entry is in a one-to-one correspondence with at least one flow.

15. The chip system according to claim 14, wherein the at least one flowlet entry is a valid entry in the flowlet routing table.

16. The chip system according to claim 13, wherein the operations further comprises:
  determining a second identifier of a second packet based on flow identity information of the second packet, wherein the second packet includes a second flow; and
  when the second flow is not a large flow, forwarding the second packet based on the second identifier and an equal-cost multi-path routing (ECMP) routing table.

17. The chip system according to claim 16, wherein the operations further comprises:
  receiving a third packet;
  determining a third identifier of the third packet based on flow identity information of the third packet, wherein the third packet includes a third flow;
  determining, based on the third identifier, whether the flowlet routing table comprises a third flowlet entry, wherein the third flowlet entry comprises the third identifier; and
  if the flowlet routing table comprises the third flowlet entry, forwarding the third packet based on the third flowlet entry, or
  if the flowlet routing table does not comprise the third flowlet entry, determining whether the third flow is a large flow, and based on a determined result, creating the third flowlet entry in the flowlet routing table or forwarding the third packet based on the ECMP routing table.

18. The chip system according to claim 16, wherein the operations further comprises:
  receiving a fourth packet;
  determining a fourth identifier of the fourth packet based on flow identity information of the fourth packet, wherein the fourth packet includes a fourth flow;
  determining whether the fourth flow is a large flow; and
  when the fourth flow is a large flow, forwarding the fourth packet based on a fourth flowlet entry in the flowlet routing table, wherein the fourth flowlet entry comprises the fourth identifier, or when the fourth flow is not a large flow, forwarding the fourth packet based on the ECMP routing table.

\* \* \* \* \*